United States Patent Office 3,365,952
Patented Jan. 30, 1968

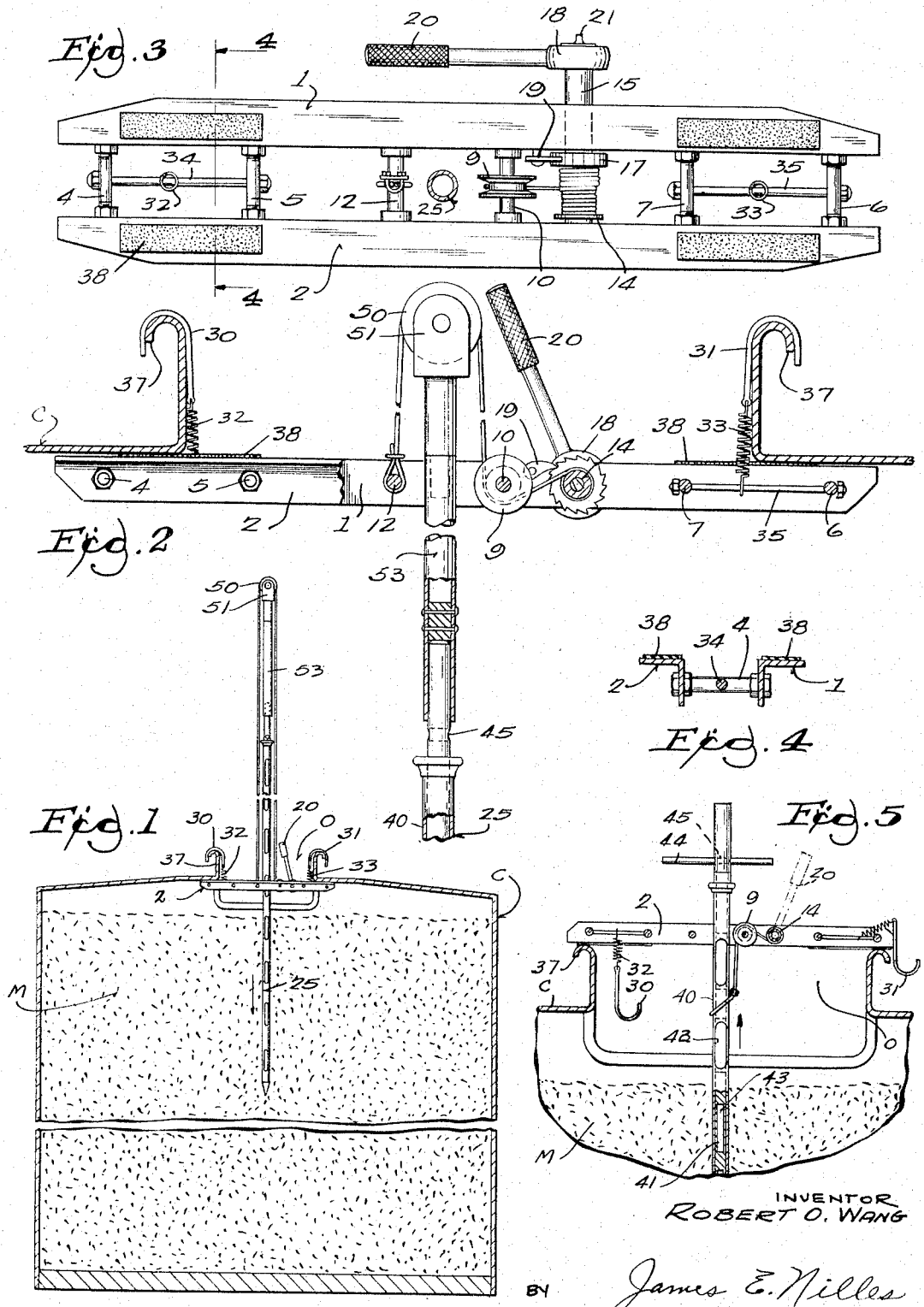

3,365,952
MECHANISM FOR INSERTING SAMPLING PROBES
Robert O. Wang, 2744 S. 61st St., West Allis, Wis. 53214
Filed Mar. 19, 1965, Ser. No. 441,093
3 Claims. (Cl. 73—425.2)

ABSTRACT OF THE DISCLOSURE

A sampling probe for inserting into railroad car or the like and which includes a frame carrying a mechanical advantage means for forcibily driving the probe into the material and which can also be used for withdrawing the probe from the material. The mechanical advantage means includes a flexible member which has power means for winding it up and thereby forcibly moving the probe.

This invention relates to mechanisms for inserting a material sampling probe into a container such as a railroad car, cargo ship, or other vessel or vehicle, or the like.

When it is desired to take a sample from a container of the above character, it is conventional to force an elongated and tubular probe downwardly into the material as far as possible. This probe consists of two concentric tubes having a series of vertically spaced openings therein. The inner tube is rotatable within the outer tube, and when the two tubes are turned to the proper position relative to one another, the holes in the tubes are in alignment which causes the sample of material to enter into the inner tube. The inner tube is then again rotated so as to cause the openings to be non-aligned and thus closed, and the entire probe is then withdrawn, carrying with it the samples.

Probes of this nature are well known, and a problem has arisen in connection with their use which has prevented the obtaining of a complete reading, particularly of the material at the bottom of the container. The difficulty is due to the fact that if the container is of any significant depth, it has been difficult, if not impossible, for the man taking the sample to force the probe entirely to the bottom of the container. It will be appreciated that these probes are often ten feet or even more in length and are not only virtually impossible to force all the way to the bottom of the container, but they are also extremely unwieldly to handle while attempting to do so. It has also been difficult for the operator to withdraw the probe after the sample has been taken.

Accordingly, the present invention provides a mechanism which can readily be attached to the material container without the use of clamps or other devices, or without requiring special tools for the attachment of the mechanism. The mechanism includes a means for providing mechanical advantage such as a pivoted lever or a ratchet wrench arrangement, by means of which the probe is forcibly insertable for the entire depth of the container. The mechanism also provides a flexible member, such as a cable or chain, which is anchored to one end of the frame and which can then be passed over a sheave located on the top of the probe, and this cable then is connected to the mechanical advantage means. With this arrangement, the probe can first be started into the material by hand and subsequently connected to the mechanism for being driven into the material with considerable force.

A more specific object of the invention is to provide a mechanism of the above type which can be readily inserted into an opening in the top of the container and loosely suspended from the edges which define the opening in the container; when the mechanism is in use, the frame of the mechanism simply bears against the upper, inner side of the container top and needs no special attaching clamps or the like to hold it in place.

With the present invention, it is also a simple matter to remove the mechanism after the probe has been fully inserted, and this is done by simply repositioning the mechanism on the top of the container to forcibly withdraw the probe until it can be readily lifted out of the material by hand.

Generally, the invention provides a compact, easily installed and removed, and highly efficient mechanism for inserting a material sampling probe into a container. The mechanism can accommodate conventional probes without any modification thereto.

These and other objects and advantages of the present invention will appear later as this disclosure progresses, reference being had to the accompanying drawings, in which:

FIGURE 1 is a vertical, sectional view through a container of material and showing the mechanism embodying the present invention as applied thereto;

FIGURE 2 is a fragmentary, elevational view of the mechanism as shown in FIGURE 1, but on an enlarged scale, and with certain parts shown in section or broken away for clarity;

FIGURE 3 is a plan view of the mechanism shown in FIGURE 2;

FIGURE 4 is a sectional view taken along line 4—4 in FIGURE 3; and

FIGURE 5 is a fragmentary, sectional view through the top of the container shown in FIGURE 1, but on an enlarged scale, and showing the mechanism turned over and laid on top of the container opening for removing the probe from the container.

The frame

Referring in greater detail to the drawings, the mechanism includes an elongated and relatively light-weight frame comprised of two angle iron members 1 and 2 arranged in parallel and spaced apart relationship with one of their flanges extending in a vertical direction. These angle members are rigidly secured together by the cross-bolt means 4 and 5 adjacent one end, and the cross-bolt means 6 and 7 adjacent the other end of the members. Generally centrally of the members is located a rotatable sheave 9 which is mounted on the shaft 10 that in turn is rigidly supported between the angle members. An anchor shaft 12 is also rigidly secured between the angle members a small distance away from the sheave.

Mechanical advantage means

A winding drum 14 is rotatably mounted on a shaft 15 which extends through the angle members and is located on the side of the sheave 9 opposite to that on which the anchor shaft is located. Secured to the drum shaft is a ratchet 17, and a reversible ratchet wrench 18 is located on the end of the shaft and outside the angle members. A lug 19 is pivotally mounted on one of the angle members and has an engaging end portion which can engage with the teeth of the ratchet to prevent the winding drum from reversing as the ratchet lever 20 is being used to force a probe into the material, as will appear. The reversible ratchet wrench is conventional per se, and by turning the projection 21 on the end of the wrench to one position or the other, the ratchet wrench can cause the winding drum to be forcibly rotated in one direction or the other. It will be noted that the space or opening 22 between the sheave 9 and the anchor shaft 12 is located generally centrally of the frame, and it is through this central opening that the conventional grain probe 25 can extend in a downward direction and into the material M located in the container C.

Suspending means

Means are provided for loosely suspending the frame within the container and adjacent and across the top opening O therein. This means comprises a pair of hook means 30 and 31, each of which has a spring 32 and 33, respectively, attached to its lower end. The lower ends of the springs are then attached to their respective rod 34, 35 for being adjustably positioned along the rod to thereby accommodate a variation in sizes of the openings in various containers. The rods in turn pass through their respective pairs of cross bolts. The length of the hooks and springs is such that when in the operating position as shown, the upper surface of the frame member is resiliently urged and held against the inner surface, that is the underside of the container, the hooks extending upwardly through the opening and embracing the opening edges for flanges 37. Skid-proof pads 38 of material such as rubber can be phovided on the upper surface of the frame so as to provide a good seat for the frame bearing against the inside of the container. With the above mounting means, the frame can be readily installed within the container as above described, and it can also be easily removed therefrom simply by removing the hooks and lifting the mechanism out.

Probe

The grain probe itself may be conventional and includes an outer tube 40 and an inner tube 41, both of which have vertically spaced openings 42 and 43, respectively, which can be aligned when the inner tube is turned to the sample taking position. The inner tube is rotated by a rod 44 which is inserted in the transverse hole 45 in the top of the inner tube. These probes may be quite extensive in length, and in order to take a complete sample should extend to the bottom of the container.

Heretofore, it has been very difficult and in many cases impossible for a complete sample to be taken because of the difficulty in fully inserting the probe. With the present invention, the probe can be forcibly driven to the bottom of the container, and it is only necessary to start the probe by hand for the first few feet of its length. A rotatable sheave 50 is mounted on a bifurcated end 51 of a tubular member 53 which is attached to slip over the upper end of the probe. The sheave thus provides an anti-friction means over which the cable is trained.

Operation

In operation, after the probe has been partially inserted into the material, the ratchet is set so as to wind the cable on the drum, thus pulling or forcing the probe downwardly to any desired depth and simultaneously forcing the frame upwardly against the container top. The inner tube is then rotated by the rod 44 and the sample permitted to enter into the aligned openings in the tube. The inner tube is then again rotated to a closed position, and the probe is ready to be withdrawn.

The present invention can also be used to facilitate removal of the probe as follows: The hooks are simply unfastened against the bias of the springs and the frame withdrawn from the container, being slipped over the upper end of the probe. The frame is then turned over and laid across the top of the opening and against the top side of the container as indicated in the figure. The cable is then secured to the probe as by winding it therearound, and the ratchet operated to pull the probe upwardly a short distance, that is, the length of the cable. This process is repeated until the probe can be removed by hand.

By means of the present invention, a compact, easily installed and removed mechanism has been provided for inserting and withdrawing a material sampling probe, all without the use of special attaching tools.

Various modes of carrying out the invention are contemplated as being within the scope of the following claims particularly pointing out and distinctly claiming the subject matter which is regarded as the invention.

I claim:

1. Mechanism for inserting a material sampling probe downwardly into an opening in the top of a material container, said mechanism comprising, an elongated and rigid, frame, means for removably supporting said frame within said material container and across said opening, a mechanical advantage means including a winch drum mounted on said frame, a flexible member anchored at one end to said frame and also secured to said drum for winding therearound, said frame having a central opening through which said probe is adapted to extend downwardly and into said material, said flexible member extending upwardly between said anchored end and said drum and over the upper end of said probe whereby said mechanical advantage means can wind up said flexible member on said drum and consequently forces said probe downwardly into the material in the container and forces said frame upwardly against said container top.

2. Mechanism for inserting a material sampling probe downwardly into an opening in the top of a material container, said mechanism comprising, an elongated and rigid frame, resiliently biased hook means for removably supporting said frame within said material container and across said opening and resiliently urging said frame against the underside of said top, a mechanical advantage means including a winch drum and racket means mounted on said frame, a flexible member anchored at one end to said frame and also secured to said drum for winding therearound, said frame having a central opening through which said probe is adapted to extend downwardly and into said material, said flexible member extending upwardly between said anchored end and said drum and over the upper end of said probe whereby said mechanical advantage means can wind up said flexible member on said drum and consequently force said probe downwardly into the material in the container while pressing said frame upwardly and tightly against the underside of said container top.

3. Mechanism for inserting a material sampling probe downwardly into an opening in the top of a material container, said mechanism comprising, an elongated and rigid frame, hook means resiliently attached to said frame for removably supporting said frame within said material container and across and beneath said opening, means for adjusting the position of said hook means along the length of said frame, a mechanical advantage means including a ratchet and lever and a winch drum mounted on said frame, a flexible cable anchored at one end to said frame and also secured to said drum for winding therearound, said frame having a central opening through which said probe is adapted to extend downwardly and into said material, said cable extending upwardly between said anchored end and said drum and extending around the upper end of said probe whereby said mechanical advantage means can wind up said cable on said drum and consequently force said probe downwardly into the material in the container and force said frame to press upwardly tightly against the underside of said container top.

References Cited

UNITED STATES PATENTS

| | | | |
|---|---|---|---|
| 1,229,273 | 6/1917 | James et al. | 73—425.2 |
| 2,657,010 | 10/1953 | Sabin et al. | 254—29 |
| 3,109,307 | 11/1963 | Papworth | 73—425.2 |

DAVID SCHONBERG, *Primary Examiner.*

LOUIS R. PRINCE, *Examiner.*

D. YASICH, *Assistant Examiner.*